(12) United States Patent
Seo et al.

(10) Patent No.: US 11,917,983 B2
(45) Date of Patent: Mar. 5, 2024

(54) PET CARE SYSTEM, PET CARE ROBOT AND METHOD FOR CONTROLLING PET CARE ROBOT

(71) Applicant: Samsung Electronics Co., Ltd., Suwon-si (KR)

(72) Inventors: Wonyoung Seo, Suwon-si (KR); Hyunkoo Kang, Suwon-si (KR); Chunseong Kim, Suwon-si (KR); Taegyu Kim, Suwon-si (KR); Jinwook Yoon, Suwon-si (KR); Kyounghoon Lee, Suwon-si (KR); Euihyun Jung, Suwon-si (KR); Donghyun Chun, Suwon-si (KR); Hongseok Choi, Suwon-si (KR); Jihoon Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 17/705,220

(22) Filed: Mar. 25, 2022

(65) Prior Publication Data

US 2022/0211010 A1    Jul. 7, 2022

Related U.S. Application Data

(63) Continuation of application No. PCT/IB2021/061583, filed on Dec. 10, 2021.

(30) Foreign Application Priority Data

Dec. 10, 2020    (KR) .................. 10-2020-0172378

(51) Int. Cl.
*B25J 13/00*    (2006.01)
*A01K 27/00*    (2006.01)
(Continued)

(52) U.S. Cl.
CPC .......... *A01K 29/005* (2013.01); *A01K 27/009* (2013.01); *B25J 11/008* (2013.01);
(Continued)

(58) Field of Classification Search
CPC ...... B25J 9/0003; B25J 9/1664; B25J 13/089; A01K 29/005
See application file for complete search history.

(56) References Cited

U.S. PATENT DOCUMENTS

2016/0219835 A1* 8/2016 Faecher ............... A01K 27/001

FOREIGN PATENT DOCUMENTS

| KR | 10-2015-0000981 A | 1/2015 |
| KR | 10-2015-0023974 A | 3/2015 |

(Continued)

*Primary Examiner* — Benyam Haile

(57) ABSTRACT

A pet care system includes a mobile robot comprising a first communication circuit configured to transmit a search signal through a first communication method and a second communication circuit configured to transmit event occurrence information through a second communication method different from the first communication method. The system includes a wearable device including a sensor configured to transmit a response signal through the first communication method in response to the search signal. The system includes a station comprising an operation dispenser configured to perform a predetermined operation based on the reception of the event occurrence information. The mobile robot further comprises a processor configured to determine a moving direction of the mobile robot based on the response signal received from the wearable device.

20 Claims, 12 Drawing Sheets

(51) Int. Cl.
  *A01K 29/00* (2006.01)
  *B25J 11/00* (2006.01)
  *B60L 58/13* (2019.01)
  *G06F 3/16* (2006.01)
  *B25J 9/00* (2006.01)
(52) U.S. Cl.
  CPC ............. *B25J 13/006* (2013.01); *B60L 58/13* (2019.02); *G06F 3/16* (2013.01); *B25J 9/00* (2013.01)

(56) References Cited

FOREIGN PATENT DOCUMENTS

| | | |
|---|---|---|
| KR | 10-2016-0149562 A | 12/2016 |
| KR | 10-2017-0107341 A | 9/2017 |
| KR | 10-2018-0089241 A | 8/2018 |
| KR | 10-1898661 B1 | 9/2018 |
| KR | 1898661 B1 * | 9/2018 ........... A01K 15/027 |
| KR | 10-2019-0071945 A | 6/2019 |
| KR | 10-2019-0103074 A | 9/2019 |
| KR | 10-2022893 B1 | 11/2019 |
| KR | 10-2020-0015879 A | 2/2020 |
| KR | 10-2020-0101528 A | 8/2020 |
| KR | 10-2153351 B1 | 9/2020 |
| KR | 10-2021-0062995 A | 6/2021 |
| KR | 10-2021-0066124 A | 6/2021 |
| KR | 10-2021-0128609 A | 10/2021 |
| KR | 10-2022-0053919 A | 5/2022 |

\* cited by examiner

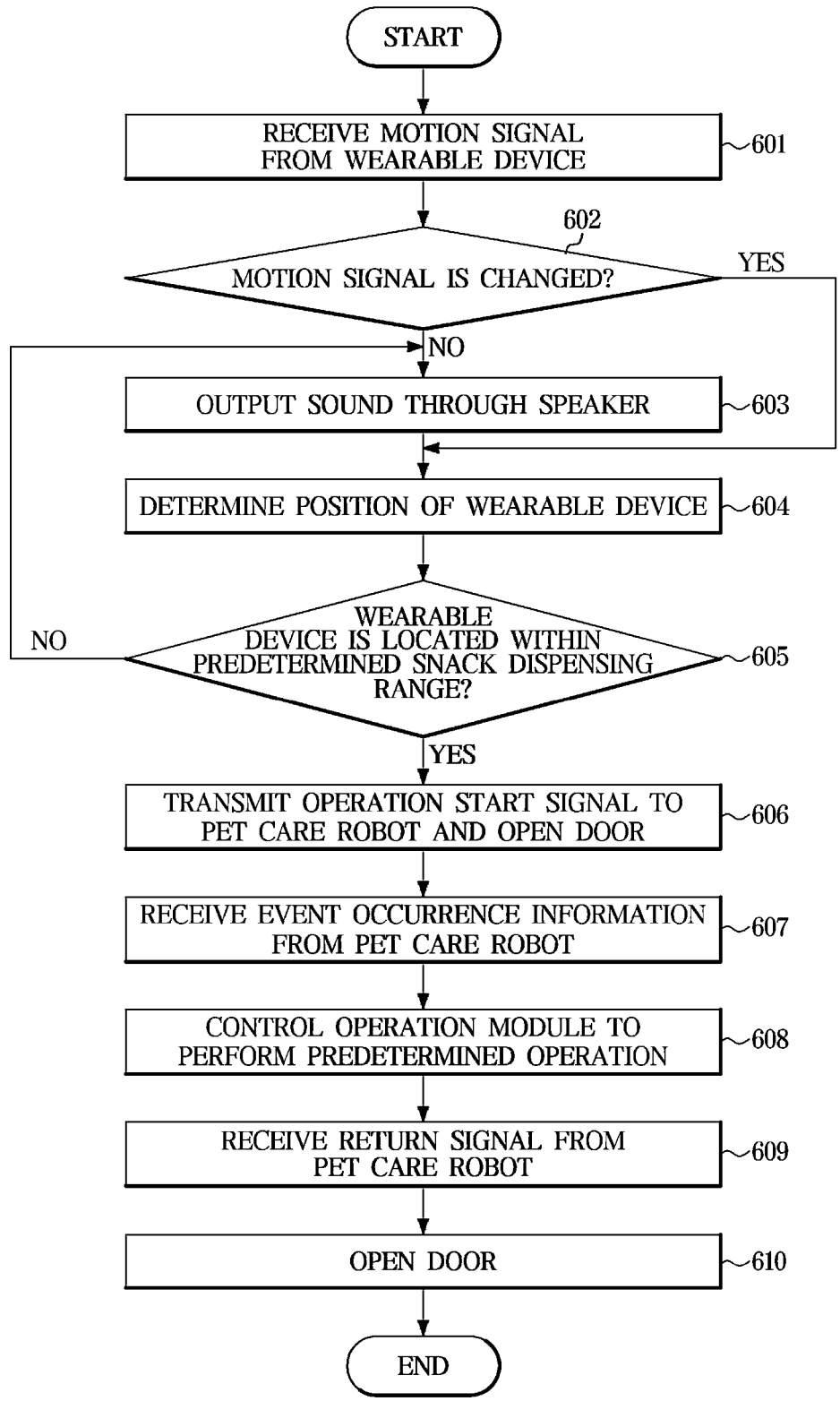

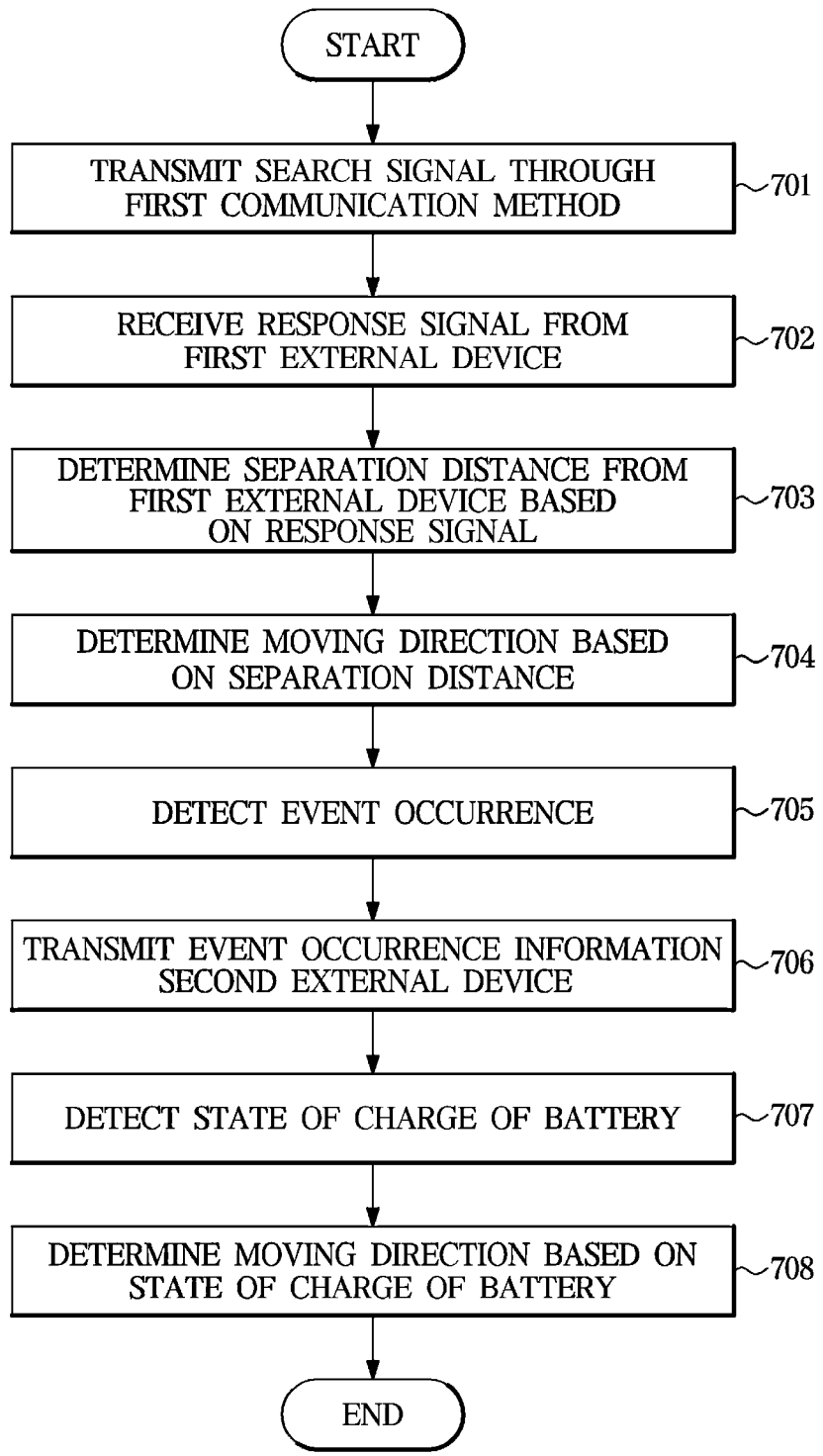

PET CARE SYSTEM, PET CARE ROBOT AND METHOD FOR CONTROLLING PET CARE ROBOT

CROSS-REFERENCE TO RELATED APPLICATIONS

This application is a Bypass Continuation of International Application No. PCT/IB2021/061583, filed Dec. 10, 2021, which claims priority to Korean Patent Application No. 10-2020-0172378, filed Dec. 10, 2020, the disclosures of which are herein incorporated by reference in their entirety.

BACKGROUND

1. Field

The present disclosure relates to a pet care system, a pet care robot, and a method for controlling the pet care robot, capable of taking care of a pet even when an owner is absent.

2. Description of Related Art

Recently, an increasing number of households have pets at home. However, when an owner who takes care of the pet goes out, the pet left alone at home may feel anxious or lethargic and may not move. If the pet becomes psychologically unstable or the amount of physical activity decreases, the health issue of the pet may occur. Also, it can be uncomfortable for the owner to leave his or her pet alone. Therefore, there is a need for a technology that can secure the psychological stability and physical activity of the pet even when the owner is absent.

SUMMARY

The present disclosure is directed to providing a pet care system, a pet care robot, and a control method of the pet care robot, capable of keeping a pet's health by inducing a movement of the pet and providing a reward to the pet even when the owner is absent.

Further, the present disclosure is directed to providing a pet care system, a pet care robot, and a control method of the pet care robot, capable of changing a motion of the pet care robot according to a distance between a wearable device worn by a pet and the pet care robot configured to follow the pet.

One aspect of the present disclosure provides a pet care system including a mobile robot including a first communication circuit configured to transmit a search signal through a first communication method and a second communication circuit configured to transmit event occurrence information through a second communication method different from the first communication method, a wearable device including a sensor configured to transmit a response signal through the first communication method in response to the search signal, and a station including an operation dispenser configured to perform a predetermined operation based on the reception of the event occurrence information. The mobile robot further includes a processor configured to determine a moving direction of the mobile robot based on the response signal received from the wearable device.

The processor of the mobile robot may be configured to determine a direction, in which the mobile robot approaches the wearable device, as the moving direction.

The mobile robot may further include a speaker configured to output a sound, and the processor of the mobile robot may be configured to control the speaker to output the sound based on the response signal.

The first communication circuit may include a plurality of antennas, and the first communication method may follow an Ultra-wideband (UWB) communication protocol.

The mobile robot may further include a power source including a battery, and the station may further include a charging circuit configured to charge the battery of the mobile robot. The processor of the mobile robot may be configured to determine the moving direction based on a state of charge of the battery of the mobile robot.

The processor of the mobile robot may be configured to determine a separation distance between the mobile robot and the wearable device based on the response signal, and configured to determine the moving direction based on the separation distance.

The operation dispenser of the station may include a dispenser configured to store contents and discharge the contents, and the predetermined operation may include an operation of discharging the contents through the dispenser.

Another aspect of the present disclosure provides a pet care robot including a main body, a first communication circuit configured to transmit a search signal through a first communication method and configured to receive a response signal corresponding to the search signal from a first external device, a second communication circuit configured to transmit event occurrence information through a second communication method different from the first communication method, a mobility driver configured to move a position of the main body, and a processor configured to control an operation of the mobility driver. The processor is configured to control the mobility driver to move the main body along a moving direction determined based on the response signal, and configured to control the second communication circuit to transmit the event occurrence information to a second external device.

The first communication circuit may include a plurality of antennas, and the first communication method may follow an Ultra-wideband (UWB) communication protocol.

The processor may be configured to determine a separation distance between the pet care robot and the first external device based on the response signal, and configured to determine the moving direction based on the separation distance.

The processor may be configured to determine the moving direction to reduce the separation distance.

The pet care robot may further include a speaker configured to output a sound. The processor may be configured to control the speaker to output the sound based on the response signal.

Another aspect of the present disclosure provides a method for controlling a pet care robot configured to perform autonomous driving, including transmitting a search signal through a first communication method, receiving a response signal corresponding to the search signal from a first external device, detecting event occurrence, transmitting event occurrence information to a second external device through a second communication method different from the first communication method based on the detection of the event occurrence, determining a separation distance between the pet care robot and the first external device based on the response signal, and determining a moving direction based on the separation distance.

The determination of the moving direction may include determining the moving direction to reduce the separation distance.

The method for controlling the pet care robot may further include detecting a state of charge of a battery of the pet care robot, and the determination of the moving direction may include determining the moving direction based on the state of charge of the battery.

The first communication method may follow an Ultra-wideband (UWB) communication protocol.

It is possible to induce a movement of a pet and provide a reward to the pet even when an owner is absent. Therefore, the physical health and mental health of the pet may be improved.

Further, it is possible to change an operation of a pet care robot according to a distance between a wearable device worn by the pet and the pet care robot configured to follow the pet. Accordingly, the pet's interest in the pet care robot may be maintained, and the pet care may be performed more effectively.

Further, it is possible to perform the pet care even without a user's manipulation, and because a pet can directly touch the pet care robot, the pet's satisfaction with play may be improved.

Further, it is possible to easily perform the maintenance of the pet care robot because a station configured to store and charge the pet care robot is provided.

Before undertaking the detailed description below, it may be advantageous to set forth definitions of certain words and phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 illustrates a method of controlling the station according to one embodiment of the present disclosure.

FIG. 11 illustrates a method of controlling the pet care robot according to one embodiment of the present disclosure.

DETAILED DESCRIPTION

Figure 1:
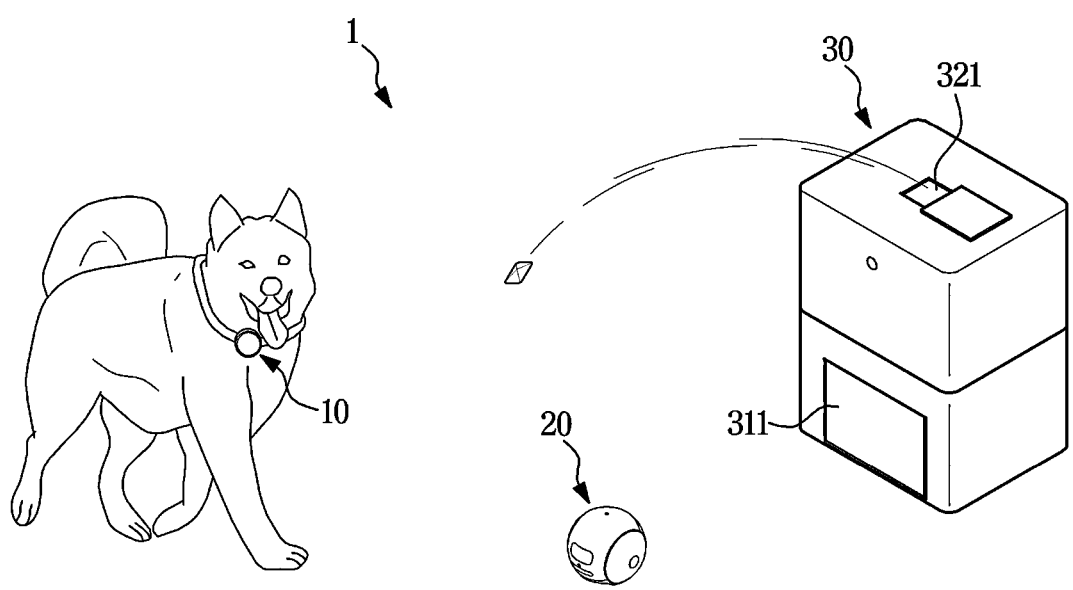
FIG. 1 illustrates a pet care system according to one embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network" and "electrical connection via an electric wire".

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

FIG. 1 illustrates a pet care system according to one embodiment of the present disclosure.

Referring to FIG. 1, a pet care system 1 may include a wearable device 10, a mobile robot 20, and a station 30. The mobile robot 20 may be referred to as a pet care robot. The wearable device 10, the mobile robot 20 and the station 30 may communicate with each other. Particularly, the wearable device 10 and the mobile robot 20 may communicate with each other, the wearable device 10 and the station 30 may communicate with each other, and the mobile robot 20 and the station 30 may communicate with each other. For example, the wearable device 10, the mobile robot 20 and the station 30 may communicate with each other through an ultra-wideband (UWB) communication technology. At least one of the mobile robot 20 or the station 30 may determine a position of the wearable device 10 based on a communication signal received from the wearable device 10.

The wearable device 10 may be worn on a pet and may be provided in various forms. For example, the wearable device 10 may be provided in the form of a necklace, clothes, shoes, or accessories. In FIG. 1, the wearable device 10 is exemplified in the form of a necklace worn on the neck of the pet. A configuration of the wearable device 10 will be described in more detail in FIG. 2.

The mobile robot 20 may interact with the pet to play with the pet. For example, the mobile robot 20 may sense a pet's touch, and may output a sound that attracts the pet's interest in response to the pet's touch. In addition, the mobile robot 20 may be movable independently and follow the pet based on a communication signal transmitted from the wearable device 10 worn on the pet. The mobile robot 20 may effectively play with the pet by performing different motions according to a distance from the wearable device 10 worn on the pet. In addition, the mobile robot 20 may image the pet and transmit the image to a user terminal (not shown). A configuration of the mobile robot 20 will be described in more detail in FIGS. 3, 4 and 5.

The station 30 may accommodate and store the mobile robot 20, perform charging of the mobile robot 20, and provide snacks to pets. A door 311 configured to open or close an accommodation space of the mobile robot 20 may be provided on a front lower end of the station 30. In addition, an outlet 321 through which snacks are discharged may be provided on an upper surface of the station 30. A configuration of the station 30 will be described in more detail in FIGS. 6 and 7.

Figure 2:
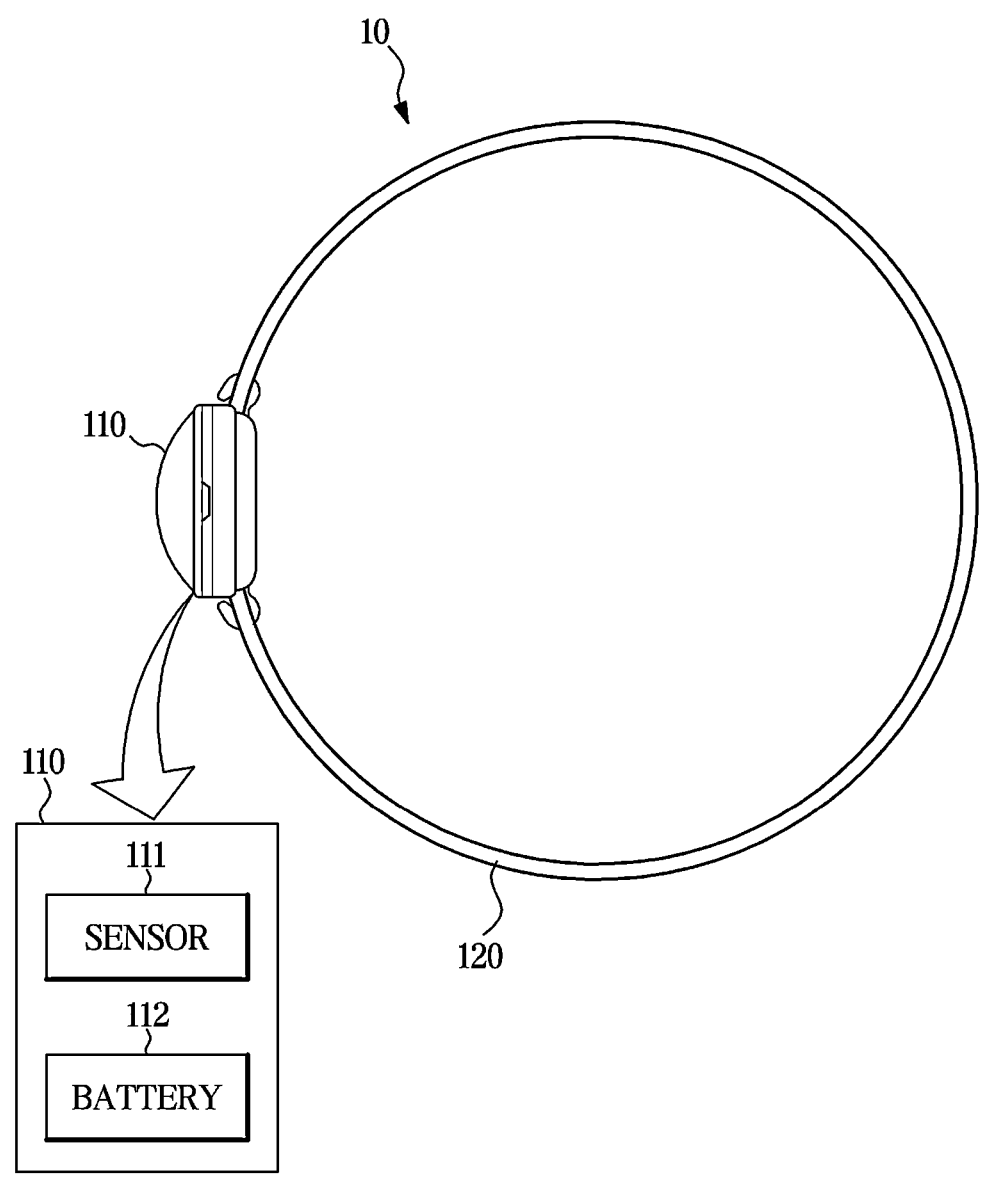
FIG. 2 illustrates a wearable device according to one embodiment of the present disclosure.

FIG. 2 illustrates a wearable device according to one embodiment of the present disclosure.

Referring to FIG. 2, the wearable device 10 may include a main body 110 and a wearing portion 120. The wearing portion 120 may be connected to both ends of the main body 110 and may be provided as a band or a string. The wearing portion 120 serves to fix the main body 110 to a body of the pet. The wearing portion 120 may be formed of various materials.

The main body 110 may include a sensor 111 and a battery 112. A circuit board on which the sensor 111 and the battery 112 are mounted may be provided inside the main body 110.

The sensor 111 may transmit a response signal in response to a search signal received from the mobile robot 20 or the station 30. The sensor 111 may include an ultra-wideband (UWB) module. UWB communication technology is a communication technology that uses a broadband frequency of 500 MHz or more and 2 nanoseconds (ns) of pulse width and that can transmit and receive signals with low power over a wide frequency band. By using UWB communication technology, high-precision position measurement is possible because a distance is theoretically measured with an accuracy of millimeters. Further, the sensor 111 may be implemented using various wireless communication technologies (for example, radio frequency (RF) communication, infrared communication, Wi-Fi™, Bluetooth™, or Zigbee™).

The sensor 111 may detect a movement of the pet and may transmit a movement signal. For example, the sensor 111 may further include an acceleration sensor, a magnetic sensor, a gravity sensor, and/or a gyroscope. The sensor 111 may include an inertial measurement unit (IMU). The IMU may be composed of an acceleration sensor, a magnetic sensor, and a gyroscope. The sensor 111 may measure a force, acceleration, and angular velocity generated by the movement of the pet, and may measure a magnetic field surrounding the pet.

The battery 112 may supply power to the sensor 111. The battery 112 may be provided inside the main body 110. The battery 112 may be provided integrally with the sensor 111 or provided to be separated from the sensor 111. The battery 112 may be charged in a wired manner or a wireless manner.

Figure 3:
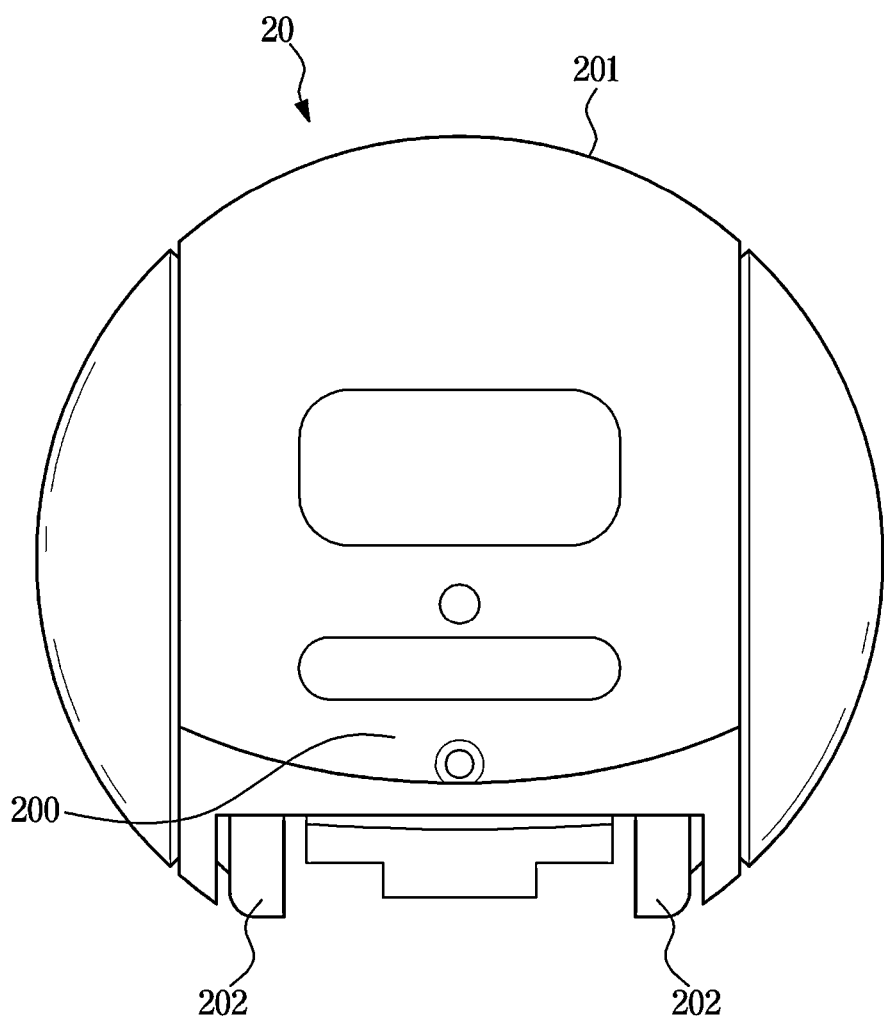
FIG. 3 illustrates an appearance of a pet care robot according to one embodiment of the present disclosure.
Figure 4:
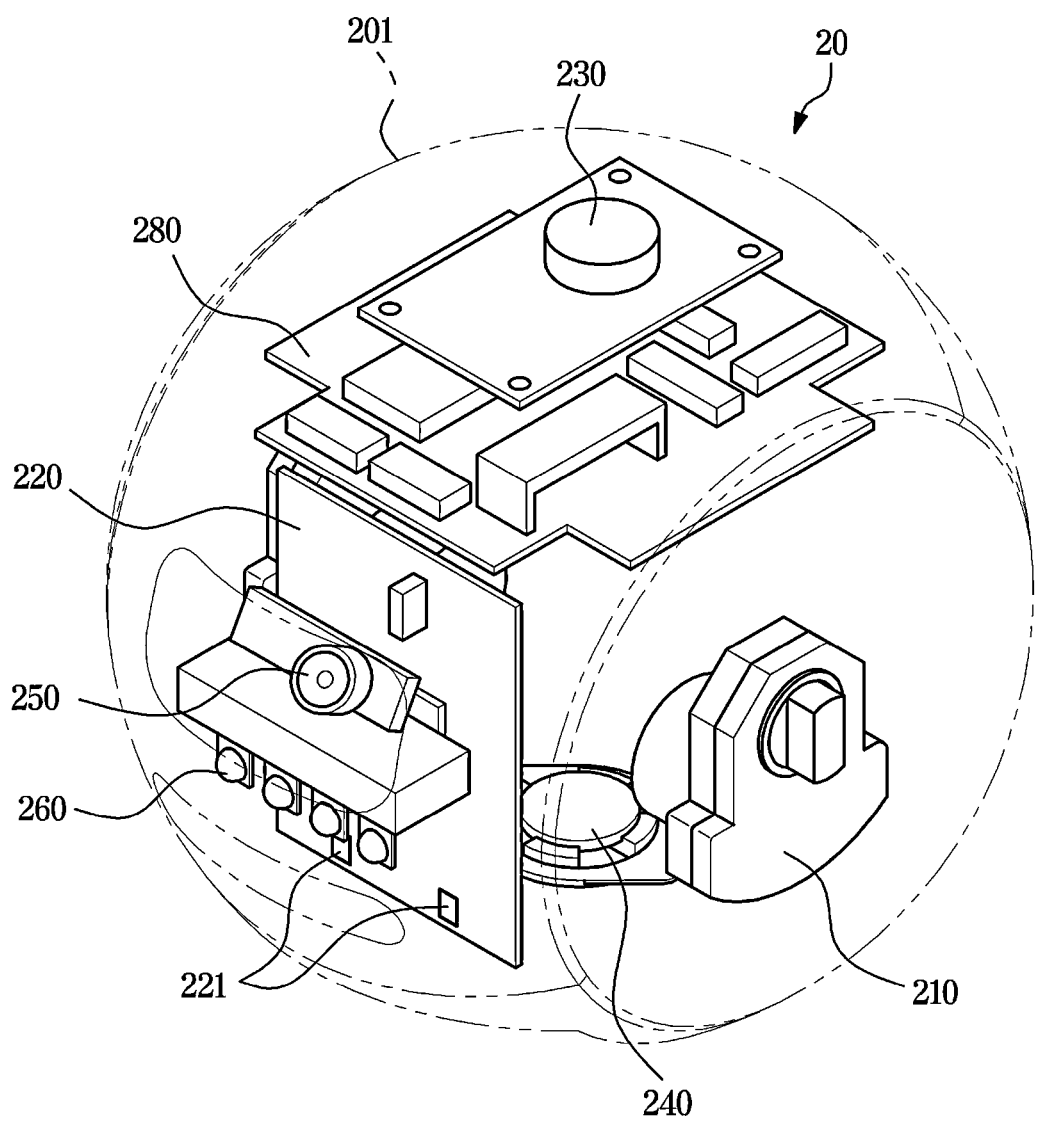
FIG. 4 illustrates an inside of the pet care robot according to one embodiment of the present disclosure.
Figure 5:
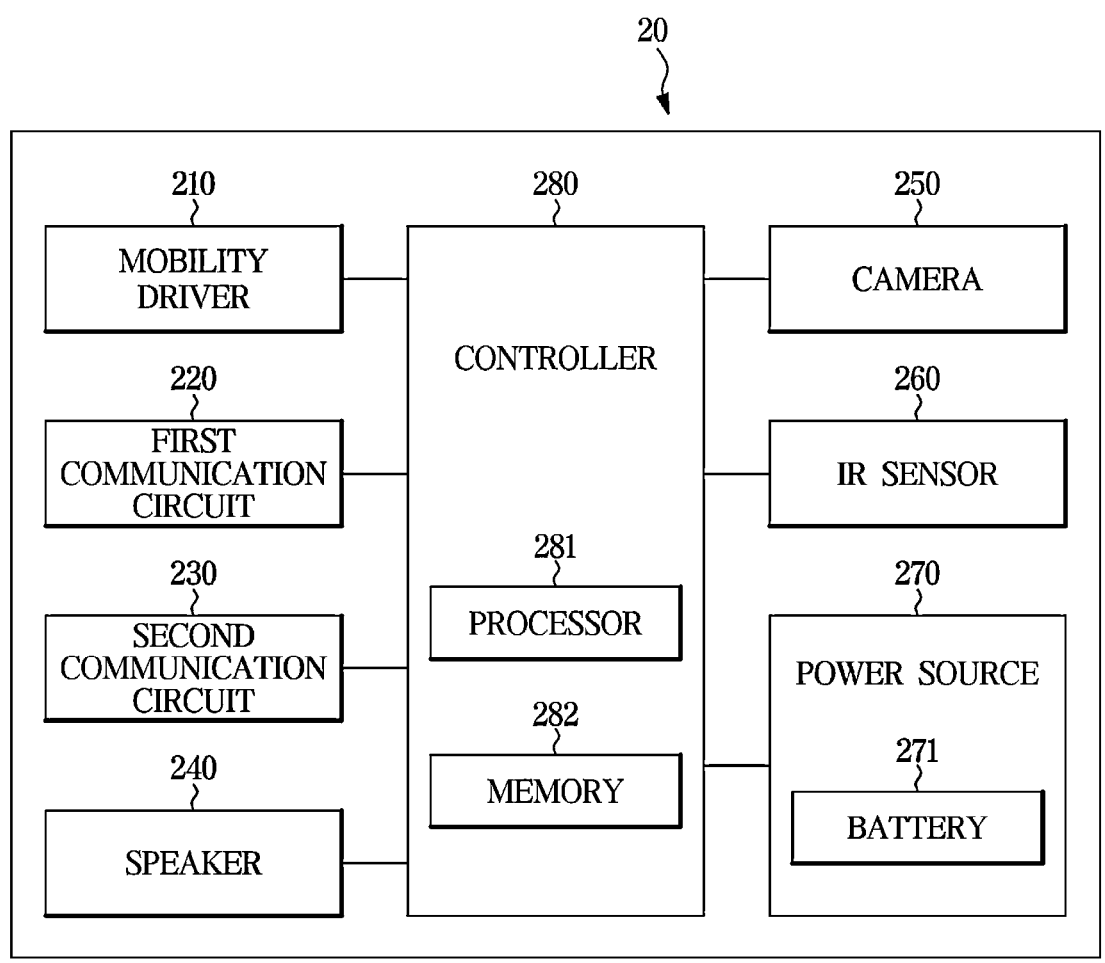
FIG. 5 illustrates a control block diagram of the pet care robot according to one embodiment of the present disclosure.

FIG. 3 illustrates an appearance of a pet care robot according to one embodiment of the present disclosure. FIG. 4 illustrates an inside of the pet care robot according to one embodiment of the present disclosure. FIG. 5 is a control block diagram of the pet care robot according to one embodiment of the present disclosure.

Referring to FIG. 3, the pet care robot 20 may include a main body 200 and a wheel 202. The wheel 202 may be provided on both left and right sides of the main body 200. The pet care robot 20 may be moved by a rotation of the wheel 202. The main body 200 may include a housing 201, and components of the pet care robot 20 may be provided inside the housing 201. The mobile robot 20 may be provided to have a spherical shape as a whole. The wheel 202 may be accommodated inside the housing 201. The spherical pet care robot 20 is merely an example, and the pet care robot 20 may have various shapes.

Referring to FIGS. 4 and 5, the pet care robot 20 may include a mobility driver 210 circuit, a first communication circuit 220, a second communication circuit 230, a speaker 240, a camera 250, and an infrared senso (IR) sensor 260, a power source 270, and a controller 280. In addition, although not shown, the pet care robot 20 may further include an obstacle sensor (not shown) configured to detect an obstacle in the vicinity. The pet care robot 20 may drive while avoiding obstacles. The controller 280 may be electrically connected to the components of the pet care robot 20 and may control an operation of each component.

In some embodiments, one or more of the configurations described in FIGS. 4 and 5 may be omitted from the pet care robot 20. In addition, the pet care robot 20 may include components other than those described in FIGS. 4 and 5. For example, the pet care robot 20 may further include a display (not shown) configured to output visual information.

The mobility driver 230 may rotate the wheel 202. A position of the main body 200 may be changed according to the rotation of the wheel 202. The mobility driver 230 may include a motor. The mobility driver 230 may be provided inside the main body 200, and may be provided on both sides of the main body 200 corresponding to the position of the wheel 202. The mobility driver 230 may be driven by receiving power from the power source 270 under the control of the controller 280.

The first communication circuit 220 may be implemented using various wireless communication technologies. For example, the first communication circuit 220 may communicate with the wearable device 10 and the station 30 by using Ultra-wideband (UWB) communication, Radio Frequency (RF) communication, infrared communication, Wi-Fi™ communication, Bluetooth™ communication, and/or Zigbee™ communication. It is appropriate that the first communication circuit 220 is a UWB module. That is, the first communication circuit 220 of the pet care robot 20 may transmit and receive a signal using the UWB communication technology.

The first communication circuit 220 may transmit a search signal through the first communication method. Further, the first communication circuit 220 may receive a response signal from the wearable device 10 responding to the search signal through the first communication method. The first communication method may be a UWB communication technology. Through the UWB communication, the controller 280 of the pet care robot 20 may easily and accurately calculate a distance from the pet care robot 20 to the wearable device 10 or the station 30. Further, the controller 280 may determine a relative position of the wearable device 10 and a relative position of the station 30 based on the signal received by the first communication circuit 220.

The first communication circuit 220 may include a plurality of antennas 221. The pet care robot 20 may determine a moving direction based on a response signal received through the plurality of antennas 221. In FIG. 4, two antennas 221 are exemplified. The plurality of antennas 221 may be horizontally mounted on the circuit board of the first communication circuit 220. Particularly, the plurality of antennas 221 may be installed to be horizontal to the ground in a direction perpendicular to the front of the pet care robot 20. The circuit board of the first communication circuit 220 including the plurality of antennas 221 may be installed in a direction perpendicular to the ground. The plurality of antennas 221 may be arranged to be symmetrical with respect to a straight line that passes through the center of the pet care robot 20 and connects the front and the rear. In addition, the pet care robot 20 may have a structure in which there are no metal parts obstructing the propagation of radio waves in the vicinity of the plurality of antennas 221 (front side, rear side, and lateral side of the antenna 221).

The second communication circuit 230 may detect occurrence of an event (an "event occurrence") and transmit event occurrence information. The event occurrence may include the movement of the pet care robot 20 by an external force. For example, when the pet touches the pet care robot 20 with its foot or mouth, a force is applied to the pet care robot 20, and thus an event of movement of the pet care robot 20 may occur. The second communication circuit 230 may transmit an event occurrence signal to the controller 280 of the pet care robot 20, and the controller 280 may analyze the event occurrence signal to determine the event occurrence caused by an external force.

Further, the controller 280 of the pet care robot 20 may control the second communication circuit 230 to transmit event occurrence information to the station 30 through a second communication method. The second communication method may be different from the first communication method used in the first communication circuit 220. For example, the second communication method may include radio frequency (RF) communication, infrared communication, Wi-Fi, Bluetooth, and/or Zigbee. As described above, the first communication method may follow an UWB communication protocol.

The second communication circuit 230 may include a motion sensor. For example, the second communication circuit 230 may include an acceleration sensor, a magnetic sensor, a gravity sensor, and/or a gyroscope. The second communication circuit 230 may include an inertial measurement unit (IMU). The second communication circuit 230 may be provided inside the housing 201 and may include a separate circuit board. In FIG. 4, the second communication circuit 230 is exemplified as being located at an upper end of the inside of the housing 201.

The speaker 240 may output various sounds. For example, the speaker 240 may output a sound that attracts the pet's interest. The speaker 240 is illustrated as being provided at a lower end of the inside of the housing 201, but may be provided at various positions. The controller 280 of the pet care robot 20 may control the speaker 280 to output a sound based on a response signal received from the wearable device 10. Further, the controller 280 may control the speaker 280 to output a sound based on the event occurrence information. The pet care robot 20 may output a sound in response to the pet's touch to the mobile robot 20 with its mouth or foot.

The camera 250 may be provided in a front portion of the inside of the housing 201. A position at which the camera 250 is provided is only an example, and thus the camera 250 may be provided at various positions. The camera 250 may obtain an image and transmit image data to the controller 280. The controller 280 may control the communication circuits 220 and 230 to transmit the image data to the user's mobile device (not shown). Further, the controller 280 may identify the pet from the image data and determine the movement of the pet. The controller 280 may control the mobility driver 210 to follow the pet using the image data.

The IR sensor 260 may transmit and receive infrared signals, and may be provided in the front portion of the inside of the housing 201. The IR sensor 260 may be used to return the pet care robot 20 to the station 30. The pet care robot 20 may return to the station 30 in response to expiration of a predetermined play time or in response to requiring the charging of the battery 271 of the power source 270. The controller 280 of the pet care robot 20 may determine a moving direction based on a state of charge (SoC) of the battery 271. For example, in response the SoC of the battery 271 reaching a predetermined minimum threshold value as the SoC is reduced, the controller 280 of the pet care robot 20 may determine a direction toward the station 30 as the moving direction toward which to move.

The controller 280 of the pet care robot 20 may align a charging terminal of the mobile robot 20 with a charging terminal of a charging circuit 310 based on the transmitted and received infrared signal, and perform docking between the charging terminal of the mobile robot 20 and the charging terminal of the charging circuit 310. Alternatively, when the charging circuit 310 of the station 30 includes a wireless charging pad, the controller 280 of the pet care robot 20 may align the battery 271 of the pet care robot 20 with the wireless charging pad based on the infrared signal, and may control the mobility driver 210 to move the pet care robot 20 to the wireless charging pad.

The return of the pet care robot 20 may also be performed by the UWB communication. The controller 280 of the pet care robot 20 may calculate a distance and an angle to the charging terminal or the wireless charging pad within the charging circuit 310 through the UWB communication with the station 30, and the controller 280 may determine a position of the charging terminal or a position of the wireless charging pad within the charging circuit 310. Further, the return of the pet care robot 20 may be performed by the UWB communication alone, and thus it is possible to omit the IR sensor 260.

In addition, as an example, in response to the pet care robot 20 being located in the vicinity of the station 30 (e.g., within 2 m), the pet care robot 20 may be moved to the inside of the charging circuit 310 of the station 30 by communicating with the station 30 through the infrared communication. In response to the pet care robot 20 being located at a distance (e.g., more than 2 m) from the station 30, the pet care robot 20 may be moved to the inside of the charging circuit 310 of the station 30 by communicating with the station 30 through the UWB communication. The power source 270 may supply power to components of the pet care robot 20. The power source 270 may be implemented as a power circuit and may include the battery 271. The power circuit and the battery 271 may be provided integrally or provided separately. The power source 270 may be provided inside the main body 200. The battery 271 may be charged in a wired manner or a wireless manner.

The controller 280 may be provided inside the housing 201 and may control the overall operation of the pet care robot 20. The controller 280 may include a processor 281 and a memory 282. The memory 282 may store programs, instructions, and data for controlling the operation of the pet care robot 20. The processor 281 may generate a control signal for controlling the operation of the pet care robot 20 based on the program, instructions, and data memorized and/or stored in the memory 282. The controller 280 may be implemented as a control circuit in which the processor 281 and the memory 282 are mounted. Further, the controller 280 may include a plurality of processors and a plurality of memories.

The processor 281 is hardware and may include a logic circuit and an arithmetic circuit. The processor 281 may process data according to a program and/or instructions provided from the memory 282, and generate a control signal according to the processing result. The memory 282 may include a volatile memory, such as a static random access memory (SRAM) or a dynamic random access memory (DRAM), for temporarily storing data, and a nonvolatile memory, such as a read only memory (ROM), an erasable programmable read only memory (EPROM) or an electrically erasable programmable read only memory (EEPROM) for storing data for a long period of time.

Figure 6:
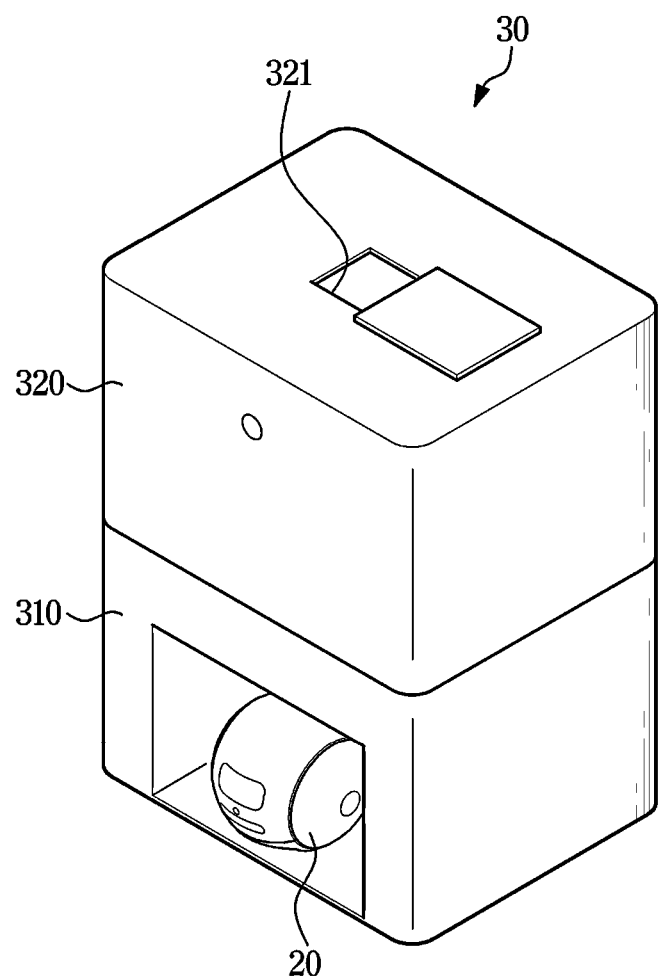
FIG. 6 illustrates a station according to one embodiment of the present disclosure.
Figure 7:
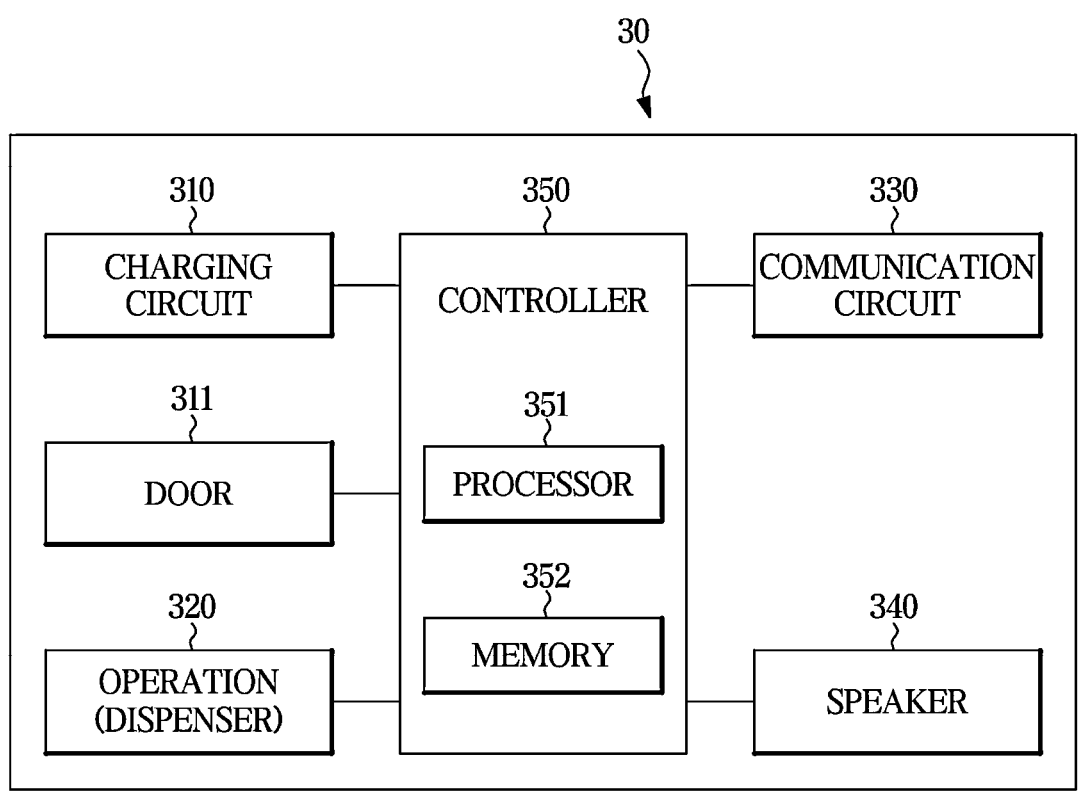
FIG. 7 illustrates a control block diagram of the station according to one embodiment of the present disclosure.

FIG. 6 illustrates a station according to one embodiment of the present disclosure. FIG. 7 is a control block diagram of the station according to one embodiment of the present disclosure.

Referring to FIGS. 6 and 7, the station 30 may include the charging circuit 310, an operation dispenser 320, a communication circuit 330, a speaker 340, and a controller 350. The controller 350 may be electrically connected to components of the station 30 and may control an operation of each component.

The station 30 may include configurations other than those described with reference to FIGS. 6 and 7. For example, the station 30 may further include a display (not shown) configured to output visual information.

The charging circuit 310 may be provided in the lower portion of the station 30. The charging circuit 310 may include an accommodation space through which the pet care robot 20 enters and exits, and may include a door 311 configured to open or close the accommodation space. The door 311 may be opened in response to the pet care robot 20 moving from the inside of the station 30 to the outside or in response to the pet care robot 20 returning to the inside of the station 30 from the outside. The door 311 may be closed in response to the pet care robot 20 being operated on the outside of the station 30 or in response to the pet care robot 20 waiting inside the station 30.

A charging terminal and/or a charging pad for charging the battery 271 of the pet care robot 20 may be provided in the accommodation space of the charging circuit 310. For example, the charging circuit 310 may include a wired charging terminal and/or a wireless charging pad. The pet care robot 20 may return to the inside of the charging circuit 310 in response to the expiration of the predetermined play time or in response to requiring the charging of the battery 271 of the power source 270.

The operation dispenser 320 may be provided in an upper portion of the station 30. The operation dispenser 320 may include a dispenser configured to store contents and discharge the contents. The contents may be snacks for pets. The operation dispenser 320 may include the outlet 321 through which snacks are discharged. The outlet 321 may be provided on the upper surface of the station 30. The position of the outlet 321 is only an example, the outlet 321 may be provided at various positions of the station 30.

The operation dispenser 320 may include a storage box and a launch pad. In response to the discharge of the snacks being required, the operation dispenser 320 may move the snacks in the storage box to the launch pad and drive the launch pad to launch the snacks through the outlet 321. The launch pad may include a structure configured to launch snacks by an elastic force of a spring. For example, the launch pad may be provided in the form of a catapult.

On the other hand, in response to the pet care robot 20 being located in the charging circuit 310, the controller 350 of the station 30 may determine the position of the wearable device 10 based on a communication signal received from the wearable device 10, and determine whether to start the operation of the pet care robot 20 based on the position of the wearable device 10. In response to the wearable device 10 being located within a predetermined snack dispensing range, the station 30 may transmit an operation start signal to the pet care robot 20 and open the door 311.

The communication circuit 330 may be implemented using various wireless communication technologies. The communication circuit 330 may communicate with the wearable device 10 and the pet care robot 20 by using Ultra-wideband (UWB) communication, Radio Frequency (RF) communication, infrared communication, Wi-Fi™ communication, Bluetooth™ communication, and/or Zigbee™ communication. It is appropriate that the communication circuit 330 is an UWB module. That is, the communication circuit 330 of the station 30 may transmit and receive an ultra-wideband communication signal. For example, the communication circuit 330 of the station 30 may be operated as a 'UWB anchor' configured to receive the UWB signal transmitted from the sensor 111 of the wearable device 10 or the first communication circuit 220 of the pet care robot 20. Further, the communication circuit 330 of the station 30 may be operated as a 'UWB tag' configured to transmit an UWB signal to the pet care robot 20. The speaker 340 may output various sounds. The speaker 340 may be provided at various positions of the station 30. The controller 350 of the station 30 may control the speaker 340 to output a sound. For example, in response to the motion signal, which is received from the wearable device 10, not being changed for a predetermined period of time, the controller 350 of the station 30 may control the speaker 340 to output a sound that attracts the pet's interest. In other words, in response to the pet not moving for a predetermined period of time, the station 30 may output a sound to attract the pet's interest, and induce the pet to move near the station 30.

The controller 350 may be provided inside the station 30 and may control the overall operation of the station 30. The controller 280 may include a processor 351 and a memory 352. The memory 352 may store programs, instructions, and data for controlling the operation of the station 30. The processor 351 may generate a control signal for controlling the operation of the station 30 based on the program, instructions, and data stored and/or stored in the memory 352. The controller 350 may be implemented as a control circuit in which the processor 351 and the memory 352 are mounted. Further, the controller 350 may include a plurality of processors and a plurality of memories.

In certain embodiments, the controller 280 of the pet care robot 20 may be referred to as a 'first controller', and the controller 350 of the station 30 may be referred to as a 'second controller'.

Hereinafter the operation of the pet care system according to one embodiment will be described in detail.

Figure 8:
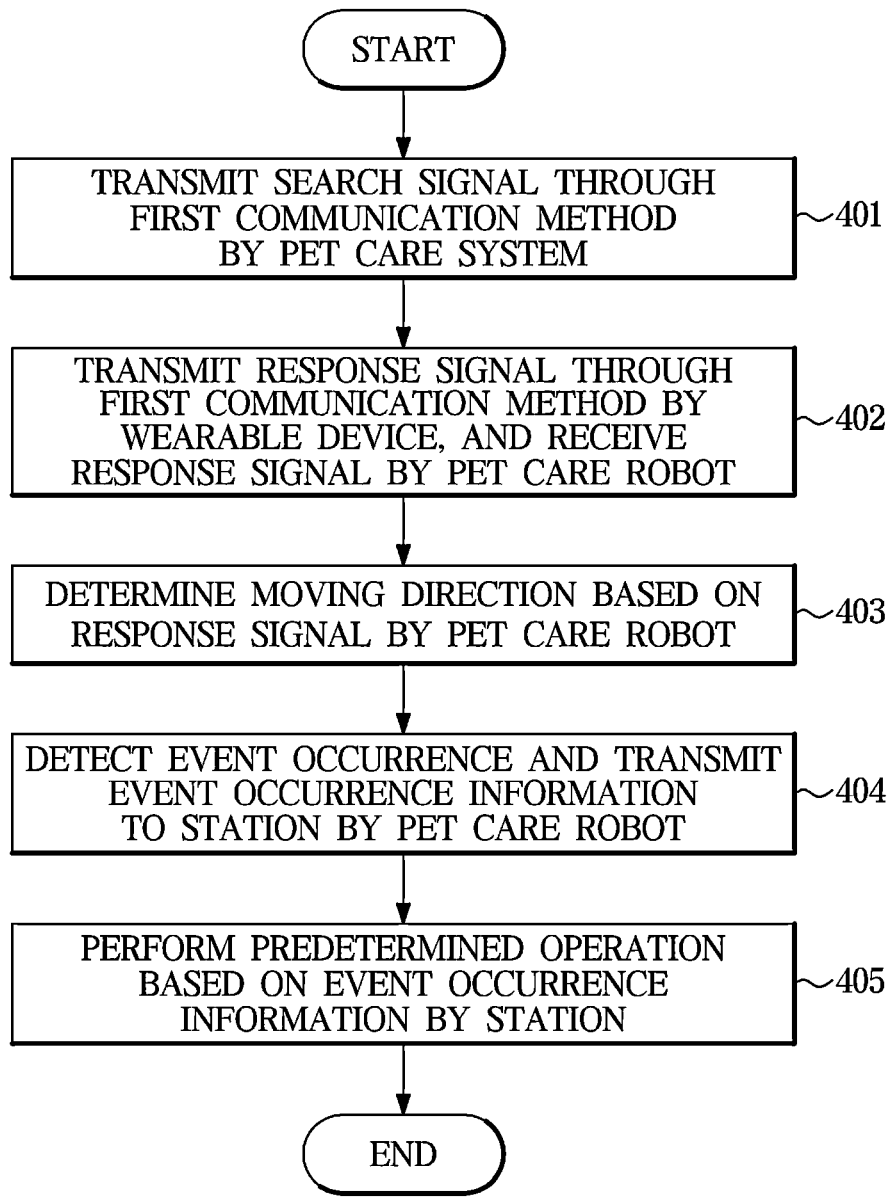
FIG. 8 illustrates an operation of the pet care system according to one embodiment of the present disclosure.

FIG. 8 is a flowchart illustrating an operation of the pet care system according to one embodiment of the present disclosure.

Referring to FIG. 8, at block 401, the pet care robot 20 may transmit a search signal through the first communication method. The first communication method may be an UWB communication technology, and the search signal may be an UWB signal according to an UWB communication protocol. At block 402, the wearable device 10 may transmit a response signal in response to the search signal through the first communication method. At block 402, the pet care robot 20 may receive a response signal from the wearable device 10.

At block 403, the pet care robot 20 may determine a moving direction based on the response signal received from the wearable device 10. The processor 281 of the pet care robot 20 may allow the mobility driver 210 to move to the main body along the moving direction. The pet care robot 20 may determine a direction closer to the wearable device 10 as a moving direction. The pet care robot 20 may determine a separation distance between the pet care robot 20 and the wearable device 10 based on a response signal received from the wearable device 10. The pet care robot 20 may be moved to the position of the wearable device 10. In response to the movement of the pet wearing the wearable device 10, the pet care robot 20 may drive while following the wearable device 10. In response to the communication among the wearable device 10, the pet care robot 20, and the station 30 through the UWB communication, the pet care robot 20 may determine the position of the wearable device 10 and the station 30 with high accuracy, and the station 30 may determine the position of the wearable device 10 and the pet care robot 20 with high accuracy.

Particularly, the pet care robot 20 may transmit a search signal (UWB signal) to the wearable device 10 and receive a response signal (UWB response signal) from the wearable device 10. The controller 280 of the pet care robot 20 may obtain delay time information based on a time, at which the response signal is received from the wearable device 10, and a time, at which the search signal is transmitted. The controller 280 of the pet care robot 20 may calculate the distance to the wearable device 10 using a Time of Flight (ToF) technology.

Alternatively, the controller 280 of the pet care robot 20 may calculate the distance to the wearable device 10 using two-way ranging. Two-way ranging is a method of measuring a distance in a way in which the transmitter and receiver share their own time information while exchanging signals several times, thereby removing a time error.

The first communication circuit 220 of the pet care robot 20 may include the plurality of antennas 221, and the controller 280 may determine the relative position of the wearable device 10 by using a time difference between signals received through the plurality of antennas 221. That is, the controller 280 of the pet care robot 20 may determine the relative position of the wearable device 10 and the pet care robot 20 by using an Angle of Arrival (AoA) positioning technology. Time Delay on Arrival (TDoA) or Phase Delay on Arrival (PDoA) positioning technology may be used. The controller 280 may calculate the angle between the wearable device 10 and the antenna 221 by using a time difference between signals received by each of the antennas 221 (TDoA technology). The controller 280 may detect a pulse period of signals received by each of the antennas 221 and calculate the angle between the wearable device 10 and the antenna 221 by using the phase difference between the pulse periods (PDoA technology). A detailed description of the positioning technology using UWB communication omitted so as to not unnecessarily obscure the embodiments herein.

In the same way, the pet care robot 20 may calculate the distance and angle to the station 30 and determine a driving route to the station 30.

At block 404, the pet care robot 20 may detect the event occurrence and transmit event occurrence information to the station 30 through the second communication method. The event occurrence may include the movement of the pet care robot 20 caused by an external force. In other words, in response to detecting the movement of the pet care robot 20 caused by the external force, the pet care robot 20 may transmit event occurrence information to the station 30. In addition, the pet care robot 20 may output a sound in response to the event occurrence caused by the external force.

At block 405, the station 30 may control the operation dispenser 320 to perform a predetermined operation based on the reception of the event occurrence information. The operation dispenser 320 may include a dispenser configured to discharge contents, and the predetermined operation may include discharging the contents through the dispenser. Further, the predetermined operation may include outputting sound through the speaker 340. The station 30 may launch a snack to the position of the pet care robot 20 in response to the reception of the event occurrence information.

Figure 9:
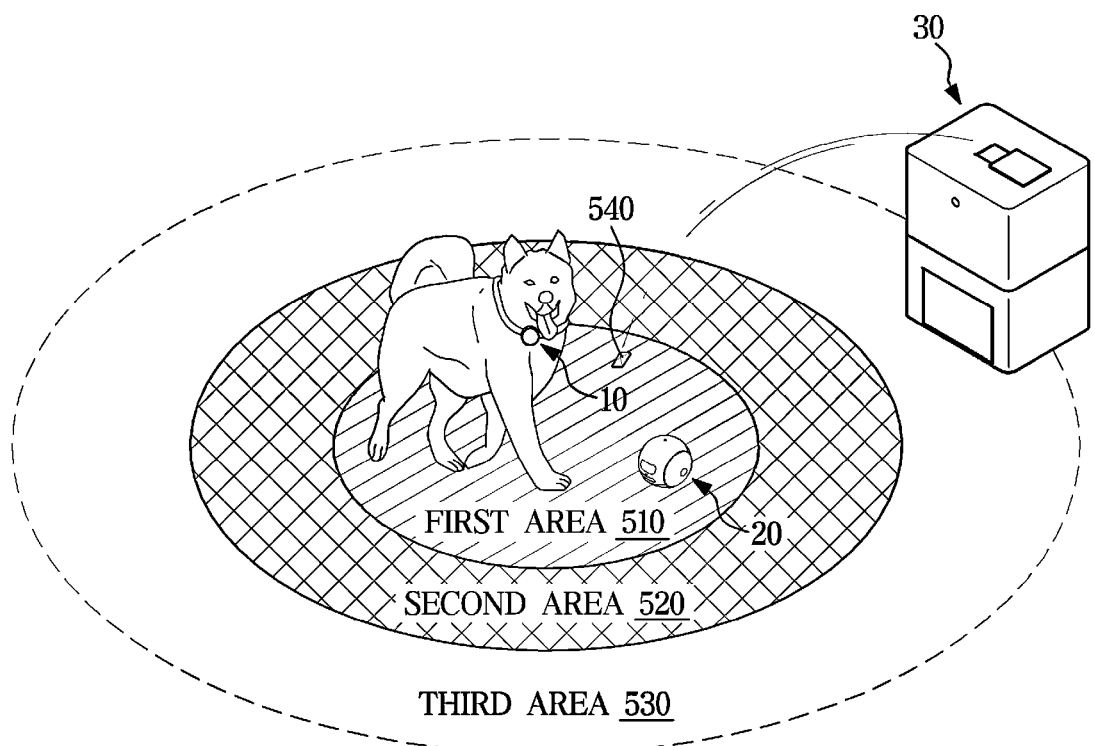
FIG. 9 illustrates an operation of the pet care robot according to a distance between a wearable device and the pet care robot.

FIG. 9 illustrates an operation of the pet care robot according to a distance between the wearable device and the pet care robot.

Referring to FIG. 9, the pet care robot 20 may perform different operations according to a distance from the wearable device 10. For example, the pet care robot 20 may stop in response to the distance to the wearable device 10 being within a first distance, and in response to the distance to the wearable device 10 being within a second distance greater than the first distance, the pet care robot 20 may change a direction based on the position of the wearable device 10. Further, in response to the distance to the wearable device 10 being greater than the second distance, the pet care robot 20 may move while following the wearable device 10.

An area in which the distance between the pet care robot 20 and the wearable device 10 is within the first distance may be defined as a first area 510. For example, the first distance may be 50 cm. Based on the distance between the pet care robot 20 and the wearable device 10 being within the first distance, the pet care robot 20 may be considered to be close to the pet. In this case, the pet may touch the pet care robot 20 with its mouth or feet, and thus the pet care robot 20 may take a stop motion.

The pet care robot 20 may determine the moving direction based on the distance from the wearable device 10. An area in which the distance between the pet care robot 20 and the wearable device 10 is greater than the first distance and within the second distance may be defined as a second area 520. For example, the second distance may be 100 cm. When the pet care robot 20 and the pet are located in the second area 520, the pet care robot 20 and the wearable device 10 may be a distance apart, but the pet may quickly approach the pet care robot 20 again. Accordingly, the pet care robot 20 may continue to attract the pet's interest by taking an action to change the direction toward the position where the pet is placed.

An area in which the distance between the pet care robot 20 and the wearable device 10 is greater than the second distance may be defined as a third area 530. Further, the third area 530 may be defined as a snack dispensing range of the station 30. That is, in certain embodiments, the distance from the station 30 to the point of the third region 530 furthest away from the station 30 may be the maximum distance at which the station 30 may launch snacks 540. The snack dispensing range of the station 30 may vary depending on the design. In response to the distance between the pet care robot 20 and the wearable device 10 being greater than the second distance, it can be seen that the pet temporarily loses interest in the pet care robot 20 and leaves the pet care robot 20. The pet care robot 20 may drive while following the pet, thereby attracting the pet's interest again.

FIG. 10 is a flowchart illustrating a method of controlling the station according to one embodiment of the present disclosure.

In FIG. 10, the pet care robot 20 is located inside the charging circuit 310 of the station 30. At block 601, the communication circuit 330 of the station 30 may receive a motion signal from the wearable device 10 worn on the pet.

At block 602, the controller 350 of the station 30 may determine whether the motion signal of the wearable device 10 is changed or not. At block 603, in response to the motion signal received from the wearable device 10 not being changed for a predetermined period of time, the controller 350 of the station 30 may control the speaker 340 to output a sound that attracts the pet's interest.

Further, at block 604, the controller 350 of the station 30 may determine the position of the wearable device 10 based on a response signal received from the wearable device 104. As described above, the wearable device 10 and the station 30 may perform the UWB communication, and the controller 350 of the station 30 may determine the position of the wearable device 10 using the positioning technology by UWB communication.

At block 606, in response to the wearable device 10 being located within the predetermined snack dispensing range, the controller 350 of the station 30 may transmit an operation start signal to the pet care robot 20 and open the door 311. In response to the door 311 being opened, the pet care robot 20 may come out of the station 30 and move to a place where the wearable device 10 is located.

At block 607, the station 30 may receive the event occurrence information from the pet care robot 20. In response to the movement of the pet care robot 20 caused by the external force, the pet care robot 20 may transmit the event occurrence information to the station 30. At block 608, the controller 350 of the station 30 may control the operation dispenser 320 to perform a predetermined operation based on the event occurrence information.

At block 609, the station 30 may receive a return signal from the pet care robot 20. The pet care robot 20 may transmit the return signal to the station 30 in response to the expiration of the predetermined play time or in response to requiring the charging of the battery 271. At block 610, the controller 350 of the station 30 may open the door 311 in response to the return signal of the mobile robot 20.

FIG. 11 is a flowchart illustrating a method of controlling the pet care robot according to one embodiment of the present disclosure.

Referring to FIG. 11, at block 701, the processor 281 of the pet care robot 20 may control the first communication circuit 220 to transmit the search signal through the first communication method. The first communication method may be an UWB communication technology, and the search signal may be an UWB signal according to an UWB communication protocol. At block 702, the first communication circuit 220 of the pet care robot 20 may receive a response signal in response to the search signal from a first external device. Further, the processor 281 may control the speaker 240 to output a sound based on the response signal. The first external device may be the wearable device 10.

The processor 281 of the pet care robot 20 may determine a moving direction based on the response signal, and may control the mobility driver 210 to move the main body along the moving direction. Particularly, at block 703, the processor 281 of the pet care robot 20 may determine the separation distance between the pet care robot 20 and the first external device based on the response signal received from the first external device. Further, at block 704, the processor 281 may determine the moving direction based on the separation distance. The processor 281 may determine the moving direction to reduce the separation distance.

The processor 281 of the pet care robot 20 may monitor whether the distance to the first external device is increased. As described above, the pet care robot 20 may perform different operations according to the distance from the first external device.

At block 705, the second communication circuit 230 of the pet care robot 20 may detect event occurrence. At block 706, the processor 281 may control the second communication circuit 230 to transmit event occurrence information to the second external device through the second communication method. The second communication method may be different from the first communication method used in the first communication circuit 220. The second external device may be the station 30. In addition, the processor 281 may control the speaker 240 to output a sound in response to detection of the event occurrence.

At block 707, the processor 281 of the pet care robot 20 may detect a state of charge (SoC) of the battery 271. At block 708, the processor 281 may determine the moving direction based on the SoC of the battery 271. For example, in response the SoC of the battery 271 reaching a predetermined minimum threshold value due to the decrease in the SoC, the controller 280 of the pet care robot 20 may determine a direction toward the second external device as the moving direction.

FIG. 12 (including FIGS. 12A-12F) illustrates the operation of the pet care system according to one embodiment of the present disclosure in more detail.

Figure 12A:
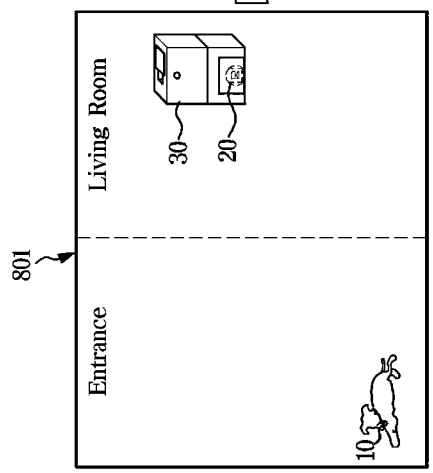
FIGS. 12A through 12F (FIG. 12) illustrate the operation of the pet care system according to one embodiment of the present disclosure in more detail.

When the owner goes out, the pet can sit quietly in front of an entrance and wait for the owner. That is, the pet may not move in front of the entrance for a certain period of time. In an operation 801 as shown in FIG. 12A, the pet wearing the wearable device 10 may be located in front of the entrance, and the station 30 accommodating the pet care robot 20 may be located in a corner of a living room. The station 30 may receive a motion signal from the wearable device 10 to determine a change in the motion signal.

Figure 12B:
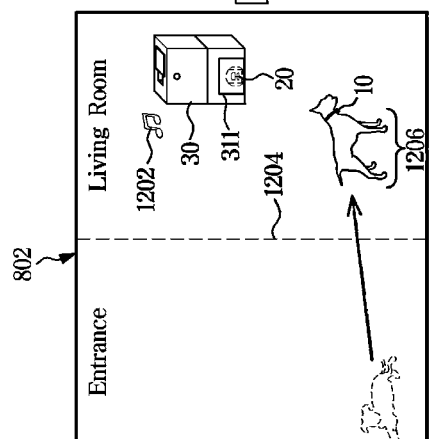
Figure 12C:
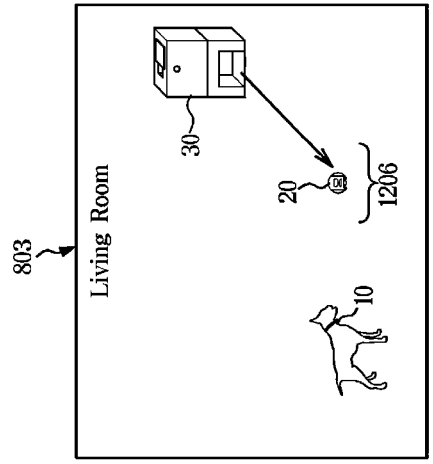

In an operation 802 as shown in FIG. 12B, in response to determining the motion signal received from the wearable device 10 has not changed for the predetermined period of time, the station 30 may output a sound 1202 that attracts the pet's interest. Operation 802 may be similar to or include operation 603 of FIG. 10. The pet may move towards the station 30 in response to the sound 1202. In an operation 803 as shown in FIG. 12C, in response to the pet being located within the snack dispensing range 1204 (e.g., third area 503), the station 30 may transmit the operation start signal to the pet care robot 20 and open the door 311. In response to the door 311 being opened, the pet care robot 20 may come out of the station 30 and move to the place 1206 where the wearable device 10 is located. Operation 803 may be similar to or include operations 606 of FIG. 10 and 704 of FIG. 11.

Figure 12D:
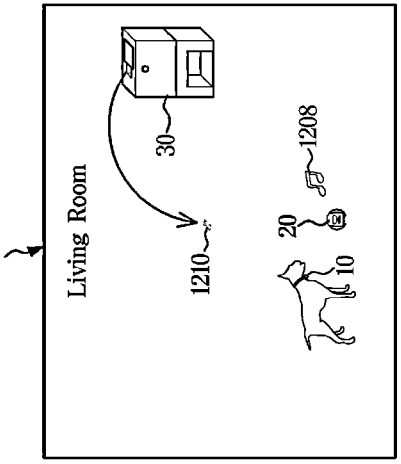

In an operation 804 as shown in FIG. 12D, the pet care robot 20 may output a sound 1208 in response to the event occurrence caused by an external force. The pet care robot 20 may transmit event occurrence information to the station 30. The station 30 may launch a snack 1210 (e.g., snacks 540) to the location of the pet care robot 20 based on the reception of the event occurrence information. Operation 804 may be similar to or include operations 608 of FIG. 10 and 706 of FIG. 11.

Figure 12E:
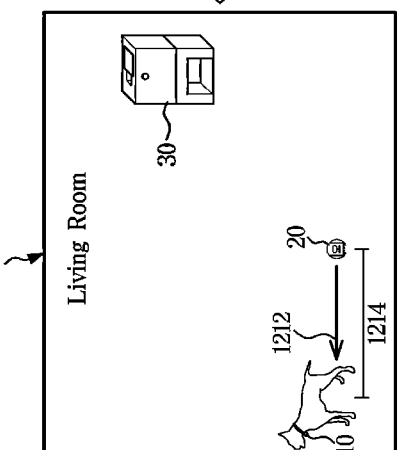
Figure 12F:
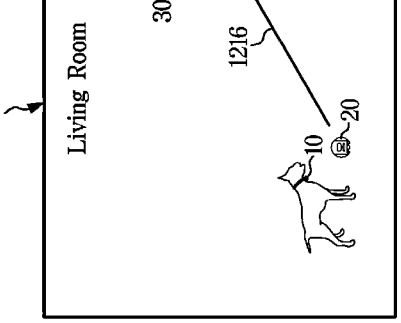

In an operation 805 as shown in FIG. 12E, the pet may temporarily lose interest in the pet care robot 20 and leave the pet care robot 20. The pet care robot 20 may determine a moving direction 1212 based on the distance 1214 to the wearable device 10. For example, as described in FIG. 9, in response to the distance 1214 between the pet care robot 20 and the wearable device 10 being greater than the second distance, the pet care robot 20 may drive while following the pet. Operation 805 may be similar to or include operation 704 of FIG. 11. In an operation 806 as shown in FIG. 12F, the pet care robot 20 may return to the station 30 in response to the expiration of the predetermined play time or in response to requiring the charging of the battery 271 of the power source 270. The pet care robot 20 may determine the moving direction based on the SoC of the battery 271. Operation 806 may be similar to or include operation 708 of FIG. 11.

As described above, it is possible to induce the movement of the pet and provide a reward to the pet even when the owner is absent. Therefore, it is possible to improve the physical health and mental health of the pet.

Further, it is possible to change the motion of the mobile robot according to the distance between the wearable device worn by the pet and the mobile robot configured to follow the pet. Accordingly, it is possible to maintain the pet's interest in the mobile robot, and it is possible to more effectively perform the pet care.

Further, it is possible to perform the pet care without a user's manipulation, and it is possible to improve the pet's satisfaction with play because the pet can directly touch the mobile robot.

Further, it is possible to easily perform the maintenance of the mobile robot because the station, in which the mobile robot is store and charged, is provided.

In certain embodiments, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

Storage medium readable by machine, may be provided in the form of a non-transitory storage medium. "Non-transitory" means that the storage medium is a tangible device and does not contain a signal (e.g., electromagnetic wave), and this term includes a case in which data is semi-permanently stored in a storage medium and a case in which data is temporarily stored in a storage medium. For example, "non-transitory storage medium" may include a buffer in which data is temporarily stored.

The method according to the various disclosed embodiments may be provided by being included in a computer program product. Computer program products may be traded between sellers and buyers as commodities. Computer program products are distributed in the form of a device-readable storage medium (e.g., compact disc read only memory (CD-ROM)), or are distributed directly or online (e.g., downloaded or uploaded) between two user devices (e.g., smartphones) through an application store (e.g., Play Store™). In the case of online distribution, at least a portion of the computer program product (e.g., downloadable app) may be temporarily stored or created temporarily in a device-readable storage medium such as the manufacturer's server, the application store's server, or the relay server's memory.

While the present disclosure has been particularly described with reference to exemplary embodiments, it should be understood by those of skilled in the art that various changes in form and details may be made without departing from the spirit and scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A pet care system comprising:
   a mobile robot comprising:
   a first communication circuit configured to transmit a search signal through a first communication method, and
   a second communication circuit configured to transmit event occurrence information through a second communication method different from the first communication method;

a wearable device comprising a sensor configured to transmit a response signal through the first communication method in response to the search signal; and a station comprising an operation dispenser configured to perform a predetermined operation based on a reception of the event occurrence information, wherein the mobile robot further comprises a processor configured to determine a moving direction of the mobile robot based on the response signal received from the wearable device.

2. The pet care system of claim 1, wherein:

the processor of the mobile robot is configured to determine the moving direction as a direction in which the mobile robot approaches the wearable device.

3. The pet care system of claim 1, wherein:

the mobile robot further comprises a speaker configured to output a sound; and the processor of the mobile robot is configured to control the speaker to output the sound based on the response signal.

4. The pet care system of claim 1, wherein:

the first communication circuit comprises a plurality of antennas; and the first communication method follows an Ultra-wideband (UWB) communication protocol.

5. The pet care system of claim 1, wherein:

the mobile robot further comprises a power source comprising a battery;

the station further comprises a charging circuit configured to charge the battery of the mobile robot; and the processor of the mobile robot is configured to determine the moving direction based on a state of charge of the battery of the mobile robot.

6. The pet care system of claim 1, wherein the processor of the mobile robot is configured to:

determine a separation distance between the mobile robot and the wearable device based on the response signal, and determine the moving direction based on the separation distance.

7. The pet care system of claim 1, wherein:

the operation dispenser of the station comprises a dispenser configured to store contents and discharge the contents, and the predetermined operation comprises an operation of discharging the contents through the dispenser.

8. A pet care robot comprising:

a main body;

a first communication circuit configured to transmit a search signal through a first communication method and configured to receive a response signal from a first external device, the received response signal corresponding to the search signal;

a second communication circuit configured to transmit event occurrence information through a second communication method different from the first communication method;

a mobility driver configured to move a position of the main body; and a processor configured to:

control an operation of the mobility driver, control the mobility driver to move the main body along a moving direction determined based on the response signal, and control the second communication circuit to transmit the event occurrence information to a second external device.

9. The pet care robot of claim 8, wherein:

the first communication circuit comprises a plurality of antennas, and the first communication method follows an Ultra-wideband (UWB) communication protocol.

10. The pet care robot of claim 9, wherein the processor is configured to:

determine a separation distance between the pet care robot and the first external device based on the response signal, and determine the moving direction based on the separation distance.

11. The pet care robot of claim 10, wherein the processor is configured to determine the moving direction to reduce the separation distance.

12. The pet care robot of claim 9, further comprising:

a battery configured to supply power to the mobility driver, wherein the processor is configured to determine the moving direction based on a state of charge of the battery.

13. The pet care robot of claim 9, further comprising:

a speaker configured to output a sound, wherein the processor is configured to control the speaker to output the sound based on the response signal.

14. A method for controlling a pet care robot configured to perform autonomous driving, the method performed by the pet care robot, the method comprising:

transmitting a search signal through a first communication method;

receiving a response signal corresponding to the search signal from a first external device;

detecting an event occurrence;

transmitting, based on the detection of the event occurrence, event occurrence information to a second external device through a second communication method different from the first communication method;

determining a separation distance between the pet care robot and the first external device based on the received response signal; and determining a moving direction based on the separation distance.

15. The method for controlling the pet care robot of claim 14, wherein the determining of the moving direction comprises:

determining the moving direction to reduce the separation distance.

16. The method for controlling the pet care robot of claim 14, further comprising controlling a speaker of the pet care robot to output a sound based on the response signal.

17. The method for controlling the pet care robot of claim 14, wherein transmitting the search signal through the first communication method comprises:

transmitting, by a first communication circuit of the pet care robot that comprises a plurality of antennas, the search signal through the first communication method that follows an Ultra-wideband (UWB) communication protocol.

18. The method for controlling the pet care robot of claim 14, further comprising:

determining the moving direction based on a state of charge of a battery of the pet care robot.

19. The method for controlling the pet care robot of claim 14, further comprising:

determining a separation distance between the pet care robot and the first external device based on the response signal, and determining the moving direction based on the separation distance.

20. The method for controlling the pet care robot of claim 14, wherein detecting the event occurrence comprises:
  detecting, by a sensor of the pet care robot, an external force applied to the pet care robot and movement of the pet care robot resulting from the detected external force.

* * * * *